United States Patent
O'Toole

(10) Patent No.: US 9,710,823 B2
(45) Date of Patent: Jul. 18, 2017

(54) AUTHENTICATED REGISTRATION OF PARTICIPANTS FOR WEB ACCESS AT LIVE EVENTS

(71) Applicant: STAD.IO LLC, Berkeley, CA (US)

(72) Inventor: Ryan O'Toole, Los Angeles, CA (US)

(73) Assignee: STAD.IO, LLC, Berkeley, CA (US)

( * ) Notice: Subject to any disclaimer, the term of this patent is extended or adjusted under 35 U.S.C. 154(b) by 0 days.

(21) Appl. No.: 15/243,605

(22) Filed: Aug. 22, 2016

(65) Prior Publication Data
US 2016/0358210 A1 Dec. 8, 2016

Related U.S. Application Data

(63) Continuation of application No. 14/978,376, filed on Dec. 22, 2015, now Pat. No. 9,432,923, which is a
(Continued)

(51) Int. Cl.
*G06Q 30/02* (2012.01)
*H04L 29/08* (2006.01)
(Continued)

(52) U.S. Cl.
CPC ..... *G06Q 30/0252* (2013.01); *G06Q 30/0255* (2013.01); *G06Q 30/0267* (2013.01); *G06Q 30/0271* (2013.01); *H04L 63/0884* (2013.01); *H04L 63/107* (2013.01); *H04L 67/02* (2013.01); *H04L 67/22* (2013.01);
(Continued)

(58) Field of Classification Search
CPC .. H04L 63/0884; H04L 63/107; H04W 60/04; H04W 12/06
See application file for complete search history.

(56) References Cited

U.S. PATENT DOCUMENTS 4,592,546 A 6/1986 Fascenda et al.
6,920,428 B2 7/2005 Greene
(Continued)

OTHER PUBLICATIONS

Phizzle connect: http://www.phizzle.com/platform/phizzleconnect/; accessed Aug. 13, 2015.
(Continued)

*Primary Examiner* — Kashif Siddiqui
(74) *Attorney, Agent, or Firm* — Nixon Peabody LLP

(57) ABSTRACT

A captive portal technology for registering and authenticating attendees, and for collecting the personal-preferences and social-profile details of individuals participating in a live-event in real-time, is disclosed. Wi-Fi connections within the live-event location are used to register and authenticate the individuals onto a proxy server. Once registered and authenticated, the proxy-server enables a monitoring main server to collect and store the preferences, activities and social profile of the individual in a dedicated database. The authentication provides the individual access to the web for social networking, blogging and other activities at the live-event site. Authorities of live-events are thereby able can identify the individual participants and their habits to provide real time information to improve ticket sales methods, provide incentives, on-site purchase capability and focused advertisements relating to the live-event to improve the live event experience of each individual.

17 Claims, 5 Drawing Sheets

Related U.S. Application Data continuation of application No. 14/263,969, filed on Apr. 28, 2014, now Pat. No. 9,226,156.

(51) Int. Cl.
| | |
|---|---|
| *H04W 12/06* | (2009.01) |
| *H04L 29/06* | (2006.01) |
| *H04W 4/02* | (2009.01) |
| *H04W 4/20* | (2009.01) |
| *H04W 48/16* | (2009.01) |
| *H04W 60/04* | (2009.01) |
| *G06Q 50/00* | (2012.01) |

(52) U.S. Cl.
CPC ........ *H04L 67/2814* (2013.01); *H04L 67/306* (2013.01); *H04W 4/021* (2013.01); *H04W 4/206* (2013.01); *H04W 12/06* (2013.01); *H04W 48/16* (2013.01); *H04W 60/04* (2013.01); *G06Q 50/01* (2013.01)

(56) References Cited

U.S. PATENT DOCUMENTS

| | | | |
|---|---|---|---|
| 7,603,321 | B2 | 10/2009 | Gurvey |
| 7,680,699 | B2 | 3/2010 | Porter et al. |
| 8,200,202 | B2 | 6/2012 | Gil et al. |
| 8,499,049 | B2 | 7/2013 | Lee et al. |
| 8,510,388 | B2 | 8/2013 | Taylor |
| 8,522,289 | B2 | 8/2013 | Athsani et al. |
| 9,226,156 | B2 * | 12/2015 | O'Toole .................. H04L 67/02 |
| 9,432,923 | B2 * | 8/2016 | O'Toole .................. H04L 67/02 |
| 2003/0035386 | A1 | 2/2003 | Sullivan |
| 2004/0078825 | A1 | 4/2004 | Murphy |
| 2006/0031120 | A1 | 2/2006 | Roehr et al. |
| 2007/0143185 | A1 | 6/2007 | Harmon et al. |
| 2008/0109238 | A1 | 5/2008 | Harmon et al. |
| 2008/0109239 | A1 | 5/2008 | Harmon et al. |
| 2008/0114653 | A1 | 5/2008 | Harmon et al. |
| 2008/0244413 | A1 * | 10/2008 | Sampson .......... G06F 17/30867 715/738 |
| 2008/0255939 | A1 | 10/2008 | Harmon et al. |
| 2009/0106117 | A1 | 4/2009 | Porter et al. |
| 2009/0249484 | A1 * | 10/2009 | Howard ................ G06F 21/567 726/24 |
| 2010/0080163 | A1 * | 4/2010 | Krishnamoorthi .... H04L 12/189 370/312 |
| 2010/0129065 | A1 | 5/2010 | Porter et al. |
| 2011/0191158 | A1 | 8/2011 | Kateraas et al. |
| 2011/0231305 | A1 | 9/2011 | Winters |
| 2012/0198497 | A1 | 8/2012 | Chan |
| 2013/0036369 | A1 * | 2/2013 | Mitchell ................ G06Q 50/00 715/753 |
| 2013/0097635 | A1 | 4/2013 | Yerli |
| 2013/0159234 | A1 | 6/2013 | Xing et al. |
| 2014/0035761 | A1 | 2/2014 | Burton et al. |
| 2014/0142733 | A1 | 5/2014 | Tropper et al. |
| 2014/0143038 | A1 | 5/2014 | Tropper et al. |
| 2015/0312760 | A1 | 10/2015 | O'Toole |

OTHER PUBLICATIONS

InStadium: http://instadium.com/network/; accessed Aug. 13, 2015.

* cited by examiner

_US 9,710,823 B2_

AUTHENTICATED REGISTRATION OF PARTICIPANTS FOR WEB ACCESS AT LIVE EVENTS

PRIORITY

The present application is a continuation application of U.S. patent application Ser. No. 14/978,376 filed Dec. 22, 2015, which is a continuation of U.S. patent application Ser. No. 14/263,969, filed Apr. 28, 2014 (now U.S. Pat. No. 9,226,156 issued Dec. 29, 2015) the entireties of which are hereby incorporated by reference.

BACKGROUND

1. Field

The present disclosure relates generally to enabling identification of and engagement with participants (attendees) within the venue of a live event using authenticated registration of each individual's mobile device at the event site for data collection and analysis.

2. Related Art

A problem faced by live-event (e.g., sporting events, concerts, etc.) administrators is the inability to identify participating attendees in real time. Now, event administrators are able to identify the purchaser of tickets but they have little or no ability to identify who actually attended the event. Most, if not all, live events are associated web sites/blogs on which individuals are allowed to input comments. Typically, most of these bloggers are people on the web who follow the event remotely (e.g., on the web), rather than those who actually attend the event. Hence, there is a real cross-over disconnect between social media event followers (social media group) and fans who actually attend the events live (real fan group).

Event administrators must improve ticket sales to fill stadiums and they also need to engage the attendees in real-time to participate by providing comments and reviews and make purchases in the venue. These activities cannot be done by approaching the social media group because they may not be in the venue.

Event administrators typically have more information about season ticket holders, who in most cases are repeat customers and may attend the events most of the time. However, there is a need to identify and approach multiple event attendees and spenders, at events, to entice them to attend other live events or to convert them to season ticket holders. There are no systems or methods that presently exist that allow this level of real-time data collection, enabling identification of attendees for such interaction.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

In accordance with one aspect of the invention, a system is disclosed that includes a plurality of wireless access points distributed in a venue, wherein at least one mobile device is configured to wirelessly connect to one of the plurality of wireless access points during a live event in the venue; an access controller connected to the plurality of wireless access points; and a proxy server connected to the access controller and a network so that a network access request from the at least one mobile device received during the live event is delivered to the proxy server through the access controller, wherein the proxy server determines whether the at least one mobile device is authenticated with the proxy server, and, if the at least one mobile device is not authenticated at the proxy server, the proxy server enables delivery of a webpage for an approved social network to the at least one mobile device, and wherein the proxy server authenticates the at least one mobile device after the at least one mobile device registers, logs-in and authenticates itself with the approved social network.

The system may further include a temporary database stored in memory. The may be stored in memory in the proxy server. The temporary database may be stored in memory communicatively coupled to the proxy server. The temporary database may include a connection whitelist having a list of approved social network webpages. The temporary database may include user information corresponding to individuals associated with each of the mobile devices authenticated at the proxy server.

The system may further include a main server coupled to the proxy server. The system may further include a historic database stored in memory. The historic database may be stored in memory of the main server. The historic database may be stored in memory communicatively coupled with the main server. User information may be collected during the live event is transferred to the historic database.

The system may further include a social network coupled to the proxy server over a network. The social network may include a web authenticating service.

In accordance with another aspect of the invention, a method is disclosed that includes connecting a mobile device to a proxy server at a live event venue; associating the mobile device with a unique identifier at the local proxy server; receiving a request at the proxy server from the mobile device to access a social media website; determining whether the unique identifier associated with the mobile device is on a list of authenticated users; if the user is not authenticated, delivering a registration page associated with the social media website to the mobile device; and authenticating the mobile device at the proxy server after the mobile device is registered at the social media website.

Authenticating the mobile device at the proxy server may include adding the unique identifier of the mobile device to the list of authenticated users.

The method may further include enabling the mobile device full connectivity to the social network after authenticating the mobile device at the proxy server.

The method may further include collecting user profile information from the social network after authenticating the mobile device and storing the user profile information with the list of authenticated users in a temporary database.

The method may further include storing activity data of the user during the live event with the list of authenticated users in the temporary database.

The method may further include transferring the user profile information and user activity data for storage in a historic database with an event identifier.

In accordance with yet another aspect of the invention, a method is disclosed that includes connecting a mobile device to a proxy server at a live event venue; associating the mobile device with a unique identifier at the local proxy server; receiving at the proxy server from the mobile device a request to access a website; determining whether the website in the request to access a website matches a list of approved websites; if the website does not match the list of approved websites, redirecting the request to access the website to a main server; downloading a script from the main server to the mobile device that enables the proxy server to connect the mobile device to a website from the list of approved websites; and authenticating the mobile device at the proxy server after the mobile device is registered at the website.

Authenticating the mobile device at the proxy server may include adding the unique identifier of the mobile device to the list of authenticated users.

The method may further include enabling the mobile device full connectivity to the web after authenticating the mobile device at the proxy server.

The method may further include collecting user profile information from the social network after authenticating the mobile device and storing the user profile information with the list of authenticated users in a temporary database.

The method may further include storing activity data of the user during the live event with the list of authenticated users in the temporary database.

The method may further include transferring the user profile information and user activity data for storage in a historic database with an event identifier.

The method may further include collecting the personal-preferences and social-profile details of the individuals participating in a live-event having large attendance in real-time.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Figure 1:
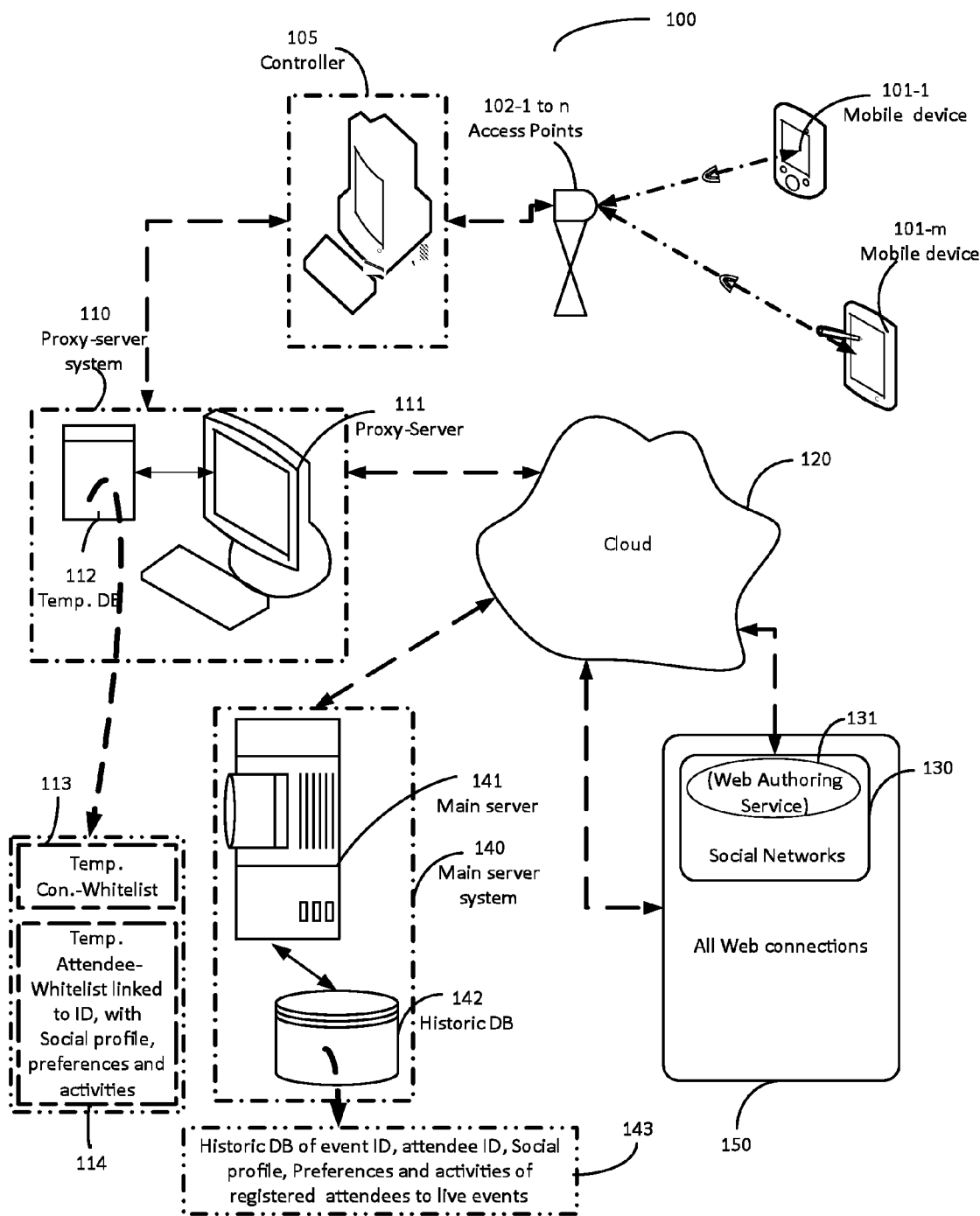
FIG. 1 is a block diagram of a registration and authentication system for live-event attendees according to one embodiment of the invention.

Embodiments of the invention relate to a captive portal technology for registering and authenticating attendees, and for collecting the personal-preferences and social-profile details of the individuals participating in a live-event having large attendance in real-time. Wi-Fi connections within the live-event location are used to register and authenticate individuals with a proxy server using a social media log-in. Once registered and authenticated, the proxy server enables a monitoring main server to collect and store the preferences, activities and social profile of the individual in a dedicated database. The authentication also provides the individual access to the web for social networking, blogging and other activities at the live-event site. The authorities of the live-events are thereby able to identify the individual participants and their habits to provide real-time information to improve ticket sales methods, provide incentives, on site purchase capability and focused advertisements relating to the live-event to improve the live event experience of each individual.

There are many examples of live-events at which the systems and methods described herein. For instance, live-events having large attendance include NFL football games, usually in stadiums holding more than ten thousand spectators, college football games in similarly or larger stadiums, baseball games in the stadiums of National and American League teams, live concert venues, soccer games, NBA basketball games, and other spectator events that have many thousands of spectators. In another example, a venue at which the systems and methods described herein may be used include restaurants, coffee shops, bars, and the like, that have fewer patrons. For instance, customers may attend a concert at a bar or coffee shop that has a capacity of less than one hundred attendees. The venue may be any location at which there are people in attendance with smart phones or other mobile devices. It will be appreciated that the number of people in attendance at the venue may be any number including less than or greater than one hundred attendees or less than or greater than ten thousand spectators.

The systems and methods disclosed herein allow collection and compilation of data regarding attendees and their activities at live-events using the attendee's mobile device. The systems and methods enable customer interactions within and outside the live-event venue during the live-event. This data can be used to, for example, provide improved customer service, enable focused ticket sales, and enable generation and delivery of focused commercial advertisements within the venues during live-events.

Connectivity and data collection are enabled by providing distributed hot-spots, typically Wi-Fi, covering a venue with large attendance for access by the dedicated mobile devices of the attendees of a live-event. The mobile devices of attendees (MDAs) attending the live-event are registered and authenticated using a social media account. The registration and authentication enable a local proxy server to gather the social profile information on the attendees to the live event from the social media. In one embodiment of the invention this information combined with the information regarding the activities such as purchases, blogging connections, comments and other interaction of the attendees are recorded and saved by the proxy server in a temporary database during the live-event. The user activity can be generated using the capability provided by the registered and authenticated MDAs. This data is used to update an attendee history database, on a main monitoring server, at the end of the live-event or even during the event.

This data can be analyzed to provide information to event managers relating to who is attending an event compared to who is buying tickets, and to provide focus for improving return on advertisement expenditure and to provide attendees improved customer service based on their past involvement for a much more valuable live-event experience. This data also allows the event managers to differentiate between individuals who just follow and comment on live-events and individuals who attend the live events enabling the event managers to focus their marketing efforts. The data collected allows attendee-faced advertisements to be developed and presented, identify high-value individuals attending the live-events, provide incentives to the frequent attendees, bloggers and commenters with high social-following, identify high spenders at events, and enable focused ticket sale efforts and promotions to attendees, to improve return for advertising expenditure.

In this disclosure, the terms attendee and mobile device of attendee (MDA) may be used interchangeably to refer to a mobile device of an attendee. It will be further appreciated that each attendee can be identified by his or her personal mobile device.

FIG. 1 is an exemplary block diagram of a system 100 for registration and authentication of the attendees 101-1 to 101-m in the venue of a live-event in real-time, enabling them to connect to approved web portals for interactions and concluding transactions, in accordance with one embodiment of the invention. As shown in FIG. 1, the system 100 includes a plurality of access points 102-1 to 102-n, an access controller 105 and a proxy server system (PSS) 110. The PSS 110 includes a proxy server 111 and a temporary database 112. The temporary database may be stored in memory in the proxy server 111 or memory in the PSS 110 that is accessible by the proxy server 111. The system 100 also includes a main server system 140 that includes a main server 141, having at least a processor and storage memory as well as a historic database 142. The historic database 142 is stored in memory in the main server 141 or a dedicated memory in the MSS 140 that is accessible by the main server 141. In FIG. 1, the web 150, including a social network 130 and a web authoring service 131, is shown coupled to the main server system 140 and proxy server system 110 over a network 120 (e.g., the cloud). Though the connections between the main server system 140 and the proxy server system 110 are shown as being over the web, it does in no way limit the connection from being a dedicated link, such as by cable, radio relay, wireless connection, or satellite connection.

The access points 102-1 to 102-n, are hotspots within the venue that provide wireless connectivity for the mobile devices 101-1 to 101-m. Example of access points, e.g., Ruckus/NetGear access points that are interconnected as described below (and not directly to a cellular network, through a wireless router, which is the typical function of the access points) to The access points 102-1 to 102-n provide a wireless local area network over which the mobile devices (MDAs) 101-1 to 101-m can communicate. The wireless connectivity provided by the access points 102-1 to 102-n may be Wi-Fi (e.g., based on IEEE 802.11 standards). The hotspots or access points 102-1 to 102-n are enabled as discoverable and linkable within the venue during the live event, so that the mobile devices 101-1 to 101-m can connect to one or more of the multiple hotspots 102-1 to 102-n. The number of access points 102-1 to 102-n will depend upon the venue and the live event at the venue, as will be understood by those of skill in the art.

The access controller 105 controls the connectivity of the MDAs 101-1 to 101-m within the venue, optimizing the connection links through the access points, 102-1 to 102-n, and controlling the connectivity of the MDAs 101-1 to 101-m while within the venue. In one particular embodiment, the access controller 105 is a Ruckus wireless controller. It will be appreciated that other wireless controllers may be used as the access controller 105.

The PSS 110, which may be a server, such as those available from HP, DELL or Apple computers that comprise: at least a processor, storage capability and Input output devices, is coupled to and controls the access controller 105. As will be described in further detail hereinafter, the PSS 100 acts as a gateway between the mobile devices 101-1 to 101-m and the world-wide-web 150. In particular, the PSS 110 acts as a gateway that controls and filters requests to access to the web 150 from the MDAs 101- to 101-m. The proxy server 111 includes a connection-white-list 113 and a temporary attendee whitelist 114 that are stored at the temporary database 112. The connection-white-list 113 includes a list of approved social network sites (e.g., URLs corresponding to approved social network sites) for the venue 130. The connection-white-list 113 enables the proxy server 111 to permit the MDAs 101-1 to 101-m to connect to social networks 130 on the connection-white-list 113 with limited permission and capabilities. The attendee white list 114 includes a list of event attendees, each linked to a user identifier (e.g., IP address, MAC address, etc.), a social profile, user preferences and user permissions.

The main server system (MSS) 140 includes a main server 141 and a historic attendee database 142. The historic attendee database 142 includes event information 143, including an event date, an event identifier (ID), and attendee identifier (ID). The event information 143 may additionally include the associated social profile, preferences, permissions, and activities for each user.

In FIG. 1, the web 150 relates to all potential websites that a user can access. As shown in FIG. 1, the web 150 includes social networks 130 on the permitted connections white list 113. The social networks 130 may include a web authoring site 131. The web authoring site 131 refers to a registration page associated with the social network 130 that can be delivered to the mobile devices 101-1 to 101-m.

In one embodiment of the invention, an MDA 101 connects to one of the one or more access points 101 at the venue before or during the live event. The MDA sends a request to access the web (i.e., by entering the URL corresponding to the social network 130 or another website 150) to the access point 102, which sends the request to the PSS 110 via the controller 105. The PSS 110 compares the user identifier associated with the MDA 101 to the user IDs on the attendee whitelist 114. If the user identifier of the requesting MDA 101 does not match the user identifier in the attendee whitelist 113, the MDA 101 must be registered and authenticated on the system 100.

If the user request for the website is a request to access the social network 130, the PSS 100 verifies that the requested social network is on the connection white-list 113 and delivers the request social network website to the MDA 101. The registration and authentication is then done by connecting the MDA 101 to the requested, approved social network 130. Once connected to the approved social network, the MDA 101 can sign in and register with the web-authoring service 131 of the selected social network 130. The completion of registration and web-authoring of the MDA 101 with the social network is monitored by the PSS 110 and the completion of the sign-in with the social network enables the proxy server 111 to locally register and authenticate the MDAs 101 and add the MDA 101 to the attendee-white-list 114, thereby identifying the attendee within the live-event arena. The authentication also allows the proxy server 111 to collect and save the preferences and social profile, of the registered and authenticated MDAs 101-1 to 101-m, available for down load on the social network, on the temporary database 112, on the proxy server system 110, linked to the mobile device IDs in the temporary attendee-database 114. Once an attendee's ID from within the venue is entered on the attendee-white-list in the attendee database 114, the registered and authenticated MDA 101-1 to 101-m is able to connect, with full connection capability, as dictated by the permissions available to the attendee, to any approved web site 150 over the web, including the social networks 130 for commenting, blogging and contacting friends and other activities including ordering services within and outside the venue. In one embodiment a summary (log) of these activities, while in the venue is also retained in the attendee database 114 until the end of the live-event or some other selected time. In an alternate embodiment the MDA 101-1 to 101-m that are registered and authenticated are able to connect to the main server system (MSS) 140 through the PSS 110 via the link, which is typically the web 120, between the PSS 110 and the MSS 140, to download a script, which typically is a java script (short Java program) that will run on the MDAs, that enable the transfer of the activity data in real-time to the MSS 140. In all embodiments the information in the attendee database 114 and the activity data are transferred to the MSS 140 to update the historic database. In some embodiments, the transfer occurs over the web 120. The historic database 142 includes the historic information 143, which includes at least a date of event, an event ID, and ID for the attendee with associated social profile, preferences, and activities within the venues for all registered and authenticated MDAs 101-1 to 101-m in the live-events.

If an unregistered and unauthenticated MDA 101 attempts to connect to a web site other than those in the white-listed social networks 130 on the temporary connection-white-list 113, the proxy server 111 provides a temporary redirect of the request to the main server system (MSS) 140. The proxy server 111 essentially blocks access to the web 150, other than for limited access to the social networks 130 which are on the connection white-list 113, for MDA 101 that are not registered and authenticated with the proxy server 111. The redirect allows the MSS 140 to download the java script onto the un-registered MDA 101. The script down loaded, in addition to enabling continued direct connection of the MDA 101 to the MSS 140, enables a preferred social web authoring site 131 to connect to and open a registration page on the unregistered MDA 101, enabling the MDA 101 to initiate registration on the preferred social network web authoring site 131 through the proxy server 111. This enables the un-authenticated MDA 101, to sign-up or sign-in to the white-listed social network and hence get authenticated on the proxy server 111, as described before.

The authentication includes addition of the specific MDA 101 to the temporary attendee white-list within the temporary attendee-database 114 on the PSS 110. Upon authentication of the MDA 101, the proxy server 111 is able to collect and save the preferences and social profile of the specific registered and authenticated MDA 101 in the temporary attendee-database 114. Once the MDA 101 has been registered, authenticated, and white-listed in the temporary attendee-database 114, the MDA 101 is enabled to connect to all approved web sites 150 (both social 130 and others) for active involvement in the venue and outside from the venue of the live event. The authentication and white-listing process also allow the proxy server system 110 to save the collected data on the MDA 101 in a historic database 142 of attendees on a main server system 140 over the web at the end of each event.

In another embodiment of the invention, the MDAs 101 entering the venue connects to one of the one or more access points 101 at the venue before or during the live event. The MDA sends a request to access the web (i.e., by entering the URL corresponding to the website 150 to the access point 102, which sends the request to the PSS 110 via the controller 105. The PSS 110 compares the user identifier associated with the MDA 101 to the user IDs on the attendee whitelist 114 to check if the MDAs 101 requesting access is already authenticated. If the user identifier of the requesting MDA 101 does not match the user identifier in the attendee whitelist 113, the MDA 101 must be registered and authenticated on the system 100. The PSS 110 redirects the request to a cloud hosted javascript application, typically on the main server (MSS) 140 or in an application store from where the Java script is downloaded and installed on the MDAs 101 web browser. This forms a client-side Javescript.

The MDAs 101 use the Javascript application to connect to and sign into a social media authentication service which is white listed on the PSS 110. On successful authentication of the MDA 101, the MDAs 101 accepts and stores an authentication access token and user profile data from the social network in its database. The MDAs 101 also synch with the MSS 140 to store the access token and user profile in the database 142 of the MSS 140.

The client side Java script makes an API call to the proxy server to enable the inclusion of the authenticated MDAs 101 in the attendee white list on the PSS 110 and allow access to the world wide web for the authenticated MDAs 101. The client side application program loads content from the MSS 140 to allow the attendees to use the services and features enabled by the application program while at the venue. The synching between the authenticated MDAs 101 and the MSS 140 enable the MDAs 101 to transfer all application and activity data at the venue to the MSS 140 in real time to update the historic database 142 on the MSS 140.

In some embodiments, the transfer occurs over the web 120. The historic database 142 includes the historic information 143, which includes at least a date of event, an event ID, and ID for the attendee with associated social profile, preferences, and activities within the venues for all registered and authenticated MDAs 101-1 to 101-m in the live-events.

The historic data 143 is compiled, analyzed and mined to establish attendee status details and preferences and is also stored within the historic database 142. During authentication and white-listing of MDAs 101-1 to 101-m during an event, the attendee status and preferences of the authenticated attendees are collected from the historic database to identify any high-value individuals (high spenders, regular attendees and bloggers with high following) in attendance to provide them further incentives to improve their activities and access while in the venue. The available status information also allows focused ads to be provided and enable focused marketing to be initiated for the attendees while in the venue (and outside the venue) based on their status and preferences. The status details also enable personalized ticket sales for new events and season ticket sales to the attendees and specifically to high-value individuals.

Figure 2:
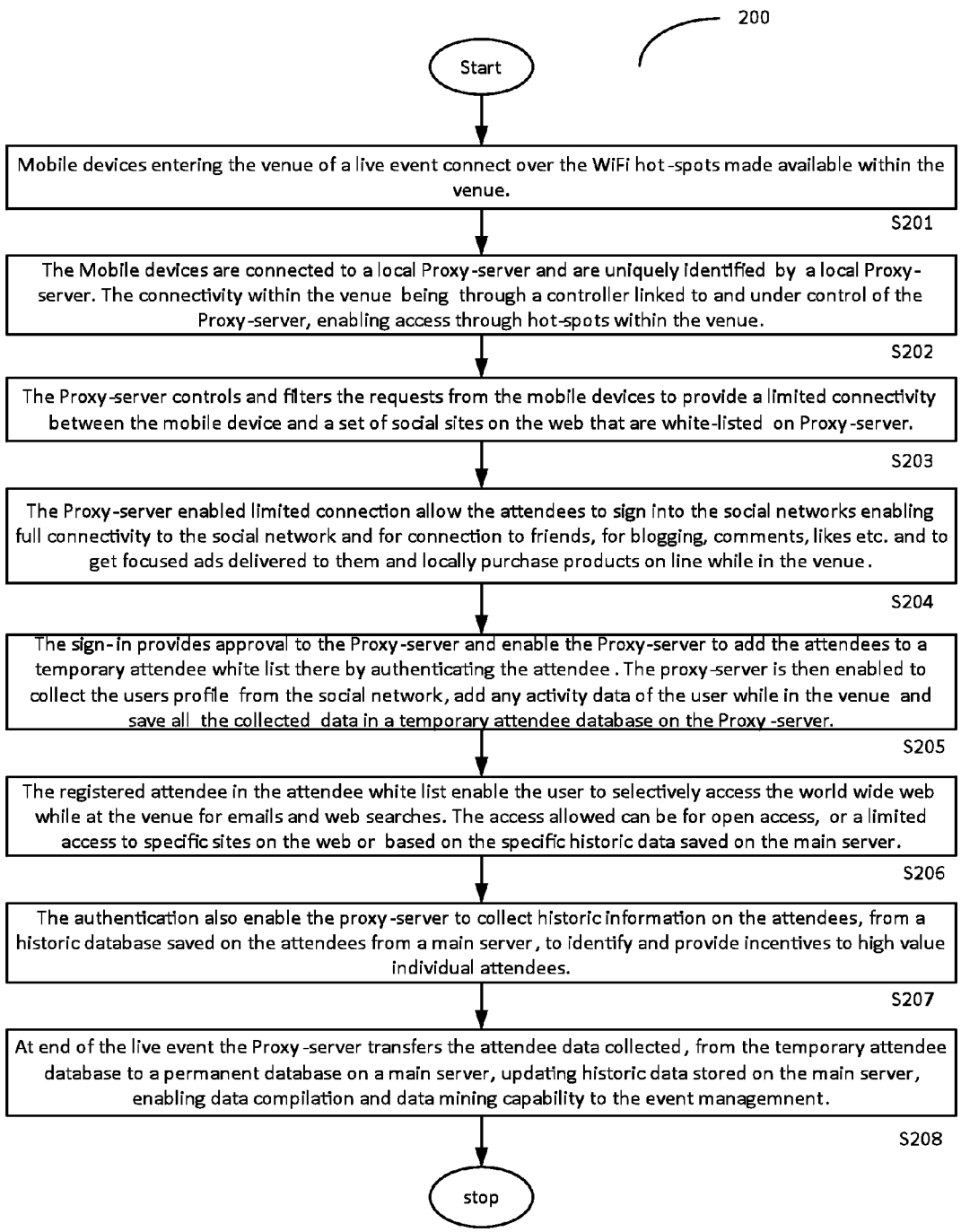
FIG. 2 is a flow chart for registration and authentication using a social media web-authoring service for data collection and enabling web access using Wi-Fi hot-spot connectivity from within a live-event venue according to an embodiment of the invention.
Figure 3:
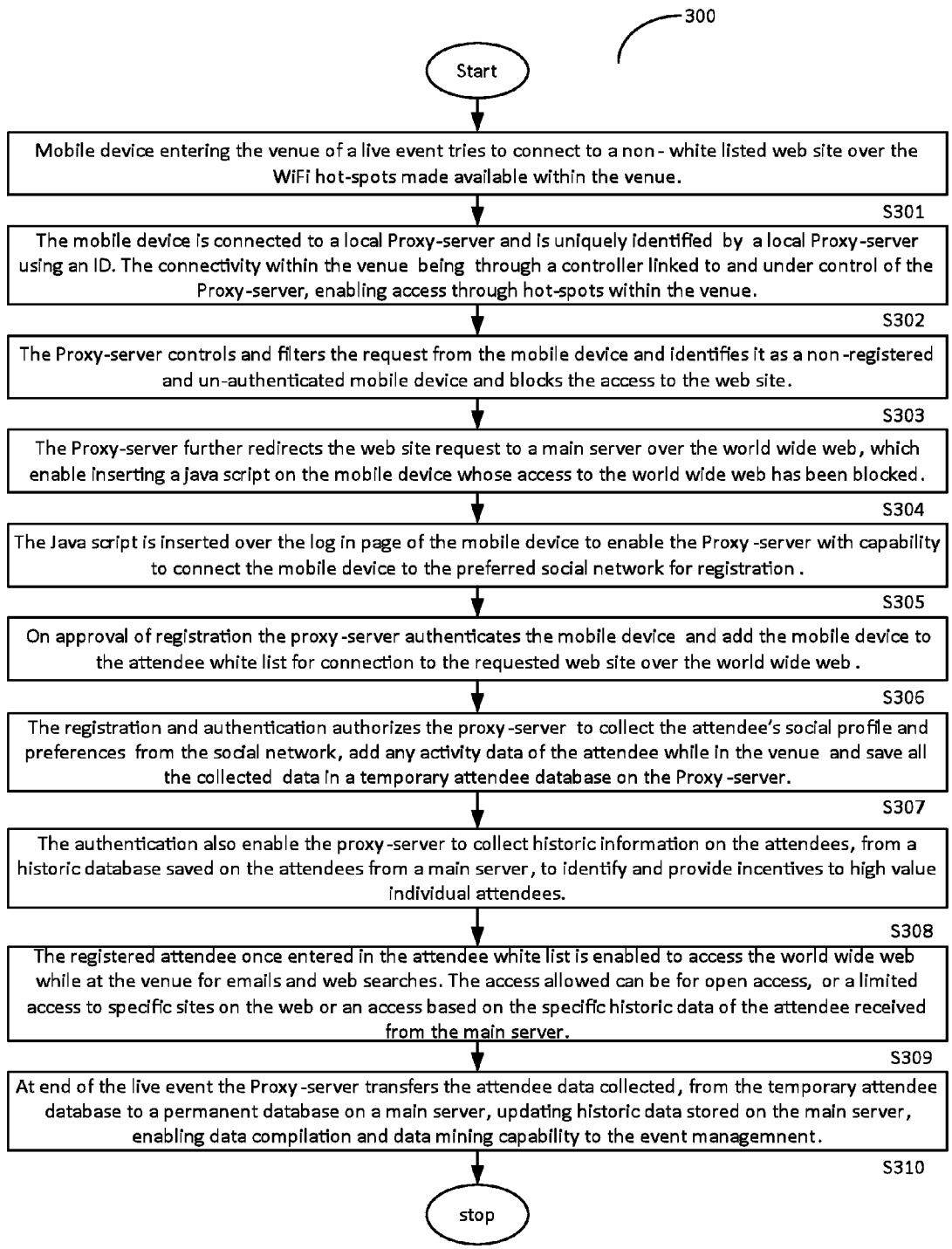
FIG. 3 is a flow chart for enabling registration, authentication and web connection with data collection for an un-registered mobile device requesting web access over a Wi-Fi hot-spot from within a live-event venue according to an embodiment of the invention.
Figure 5:
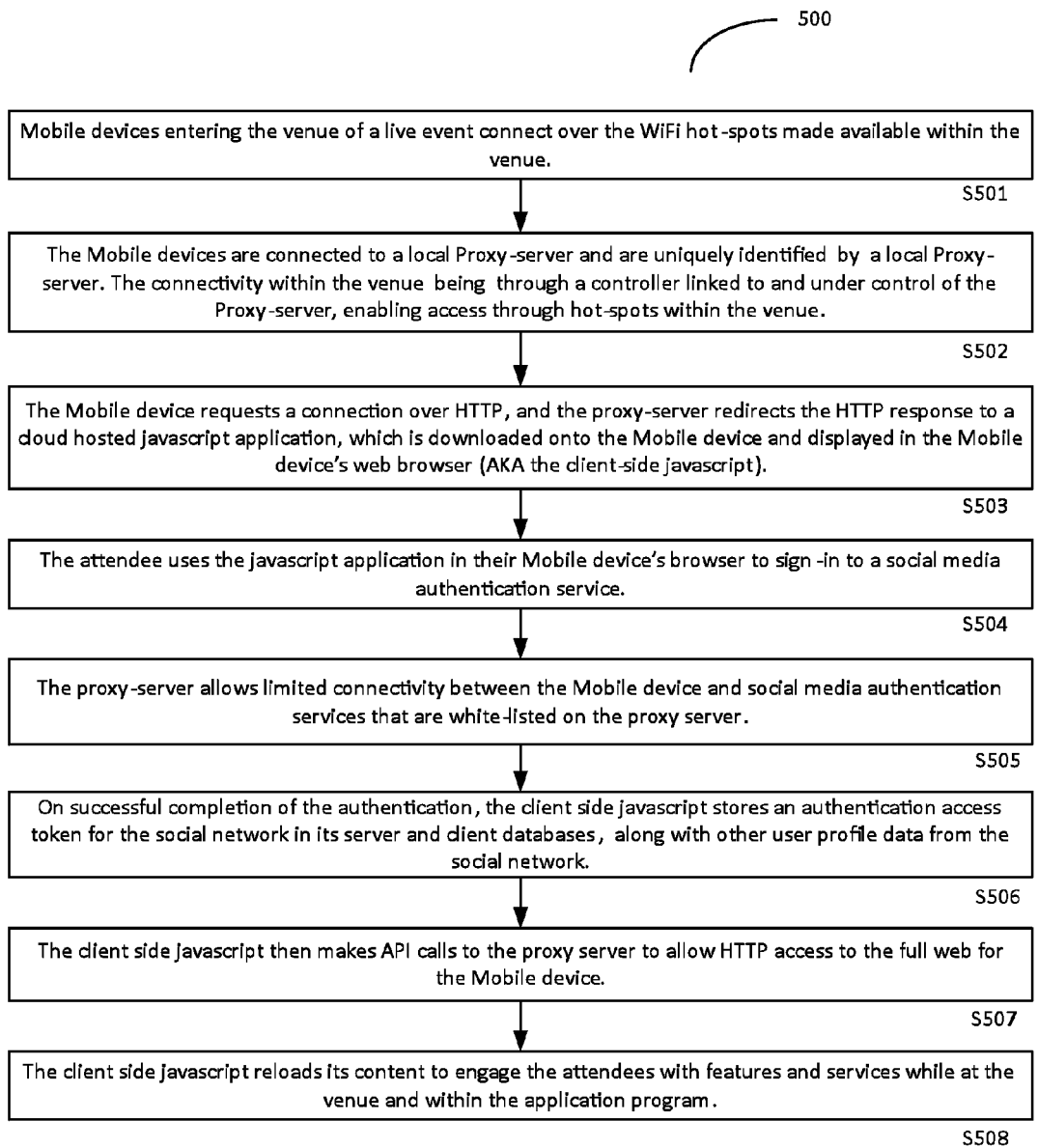
FIG. 5 is a flow chart for registration, authentication and web connection with data collection for an un-registered mobile device requesting web access over a Wi-Fi hot-spot from within a live-event venue according to a second embodiment of the invention.

FIGS. 2, 3 and 5 illustrate embodiments of the invention that may be described as a process or method. The process is depicted in FIGS. 2 and 3 as a flowchart. Although the flowcharts illustrate the process as a sequential process of operations, it will be appreciated that many of the operations can be performed in parallel or concurrently. In addition, the order of the operations may differ from that shown in FIGS. 2, 3 and 5.

FIG. 2 is a flow chart of an embodiment of registration and authentication of mobile devices (MDAs) 200. In FIG.

2, the registration and authentication process uses a social media web-authoring service for data collection. The registration and authentication process enables web access using hot-spot connectivity within the live event venue.

When an attendee with a mobile device enters the venue of a live event, the multiple hotspots within the venue of the live event are enabled as discoverable and linkable by the mobile device of the attendee (MDA). The MDA connects to the local connectivity within the venue using one of the available hot-spots. S201.

The MDAs are connected to a local proxy server and are uniquely identified by the local proxy server using an ID. The ID can be based on any mobile device identifiers, such as, for example, the MAC address, IP address, other higher level identification capabilities, etc. The MDAs connectivity within the venue is established through a controller linked to and under control of the proxy server which acts as a gateway enabling access through hot-spots within the venue. S202.

The proxy server controls and filters the requests from the MDAs initially to provide a limited connectivity between the MDAs and a set of approved social web sites on the web. The social sites to which the attendees can connect for enabling registration are managed through a pre-established connection white-list on the proxy server. S203.

The limited connections to the social network enabled by the proxy server allow the MDAs to sign into the social networks. Once the MDAs sign into the social network, full connectivity to that social network for connection to friends, for blogging, comments, likes etc. is enabled. Registration with the social network also allows the connected MDA to get focused advertisements delivered to them and enables the MDA to locally purchase products online in the live-event venue. S204.

The sign-in by the MDAs provides approval to the proxy server. The proxy server then adds the MDAs' IDs to a temporary attendee white-list to authenticate the MDAs. The proxy server is then enabled to and allowed to collect the attendees' social profiles from the social network, add any activity data of the attendee while in the venue, and save all the collected data in a temporary attendee-database on the proxy server. S205.

The registration and authentication of MDAs and the addition of the MDAs to the attendee white list enable the MDAs to selectively access the world-wide web while at the venue. For example, the MDA may be able to use the web at the venue for emails, web searches and other activities. It will be appreciated that the he web access allowed by proxy server can be unlimited open-access, limited-access to specific sites on the web, or limited access based on the historic data of the attendees saved on the main server system (MSS). S206.

The authentication also enables the proxy server to collect historic information on the attendees from the MSS. The historic data about the attendees is stored on the MSS and is data mined at the MSS, to identify high-value individuals to selectively provide incentives and conduct selective marketing of events and products. S207.

At the end of the live-event or at some other selected time, the PSS transfers the collected attendee data corresponding to the registered and authenticated MDAs from the temporary attendee database to the permanent historic database on the MSS, updating the historic data stored in the historic-database on the MSS for all attendees to the live event. This collected data provides the capability for data compilation and data-mining to the event management, allowing identification of high-value individuals, those who regularly participate/attend events, those who spend money for purchases within the arena, those who are bloggers from the arena with large following etc. This compiled data is also stored on the historic database and used to provide incentives within the arena for the high value attendees and also to provide personal attention and conduct effective marketing of new events and conduct focused season ticket sales for upcoming events. S208.

FIG. 3 is a flow chart of the registration and authentication activity when an unregistered attendee tries to access a website outside the connection white-listed social sites from within the live event venue 300. In FIG. 3, the registration and authentication activity is done using a script downloaded to the attendee's mobile device.

An attendee with a mobile device enters the venue of the live event and connects to the proxy server via the hot-spots within the event venue. The mobile device of the attendee (MDA) tries to connect to an outside web site over the world-wide-web without going through the sign-in and authentication process described with reference to FIG. 2. S301.

The hotspots that the MDAs within the live-event venue are connected to connect to a controller/connection controller and to a proxy server system (PSS), where the MDA (and, hence, the attendee) is identified using a unique ID of the mobile device. S302.

The PSS controls and filters the request from the MDA for access to the web. The proxy server identifies the MDA as a non-registered and un-authenticated MDA and blocks access to the requested web site. S303.

The PSS redirects the web site request to a main server system (MSS) typically over the web. The MSS checks the nature of the access request from the un-authorized MDA that has been blocked by the proxy server, verifies that the MDA is indeed un-registered and un-authenticated, and downloads a java script to the attendee's mobile device for insertion and running on the attendee's mobile device. S304.

The Java script inserted and run on the attendees mobile device provides the proxy server with the capability to open a connection and open an authoring page of a preferred social network for registration of the MDA. S305.

Upon completion of registration approval of and log-in to the social network by the MDA, the PSS authenticates and adds the MDA to the temporary attendee white-list for connection to the requested web site over the world-wide-web if it is one of the approved sites. S306.

The sign-in and authentication of the MDA provides approval to the PSS to collect the attendee's social profile and preferences from the social network, add any activity data of the attendee while in the venue and save the collected data in a temporary attendee database on the proxy server. S307.

The registration and authentication also enable the PSS to collect historic information on the attendees from the historic database at the main server to identify and provide incentives to high-value attendees. S308.

The registration and authentication with entry of the registered MDAs in the attendee white-list enables the attendees to access the world-wide-web while at the venue for emails and web searches. The access allowed can be open access, limited access to specific sites on the web, or limited access based on the specific historic data received from the MSS for the attendee. S309.

At the end of each live-event, the PSS transfers the attendee data collected, including the attendee social profile, attendee preferences, attendee activity log, spending pattern, etc., from the temporary attendee database to the main server. This transfer updates the historic data stored on the main server. The update to the historic data enables data compilation and data mining capability to the event management, enabling them to identify regular attendees, big spenders at events, influential bloggers etc. to improve customer service by generating customer based incentives inside the venue during events and outside after events, for improved marketing by, generation and delivery of focused advertisements to attendees to enable improved ticket sales. S310.

FIG. 5 is a flow chart of an alternate method of registration and authentication of a mobile device (MDA) 500. In FIG. 5, the registration and authentication process uses a social media web-authoring service for registration and authentication, but the information regarding the MDA and their activities are individually stored on the MDA within an application program and synched to the Main server system (MSS) in real time. The registration and authentication process enables web access using hot-spot connectivity within the live event venue.

When an attendee with a mobile device enters the venue of a live event, the multiple hotspots within the venue of the live event are enabled as discoverable and linkable by the mobile device of the attendee (MDA). The MDA connects to the local connectivity within the venue using one of the available hotspots in the venue. S501.

The MDA is connected to a local proxy server and are uniquely identified by the local proxy server using an ID. The ID can be based on any mobile device identifiers, such as, for example, the MAC address, IP address, other higher-level identification capabilities, etc. The MDA connectivity within the venue is established through a controller linked to the proxy server that acts as a gateway enabling access through hotspots within the venue. S502.

The MDA requests connection to a web site. The proxy server controls and filters the requests from the MDA to identify if the MDA is an un-authenticated MDA, the proxy server then redirects the request from the MDA if unauthenticated, to a cloud hosted javascript location, typically on a main server system (MSS), to down load the javascript on the MDA and display it on the web browser of the MDA. S503.

The MDA uses the javascript to request connection to a white listed social media authoring site providing authentication service. S504.

The PSS enables the connection to the social media site for the MDA with limited access enabling it to sign in and register with the web authoring service for authentication of the MDA. S505.

Once registered and authenticated, the social web site responds with an access token that is stored on the MDA on the MDA's database. The access token enable the authenticated MDA to be entered into the client white list on the PSS to allow it to connect to the Internet. The access token also enables synching the MDA database with the MSS database such that the access token gets stored on the MSS databases also. S506

The client side java script on the MDA makes an API call and down loads an application program which grants the MDAs access to the full network to collect, synch and save the preferences and social profile, as well as application data of the registered and authenticated MDA. S507.

The client side javascript reloads its content to enable the MDA with allowed features and services to be used from within the application program while the MDA is at the Venue of the live event. Details of the preferences and social profile, application data and activity information at the venue are synched to the MSS for updating the historic database in real time. S 508.

Figure 4:
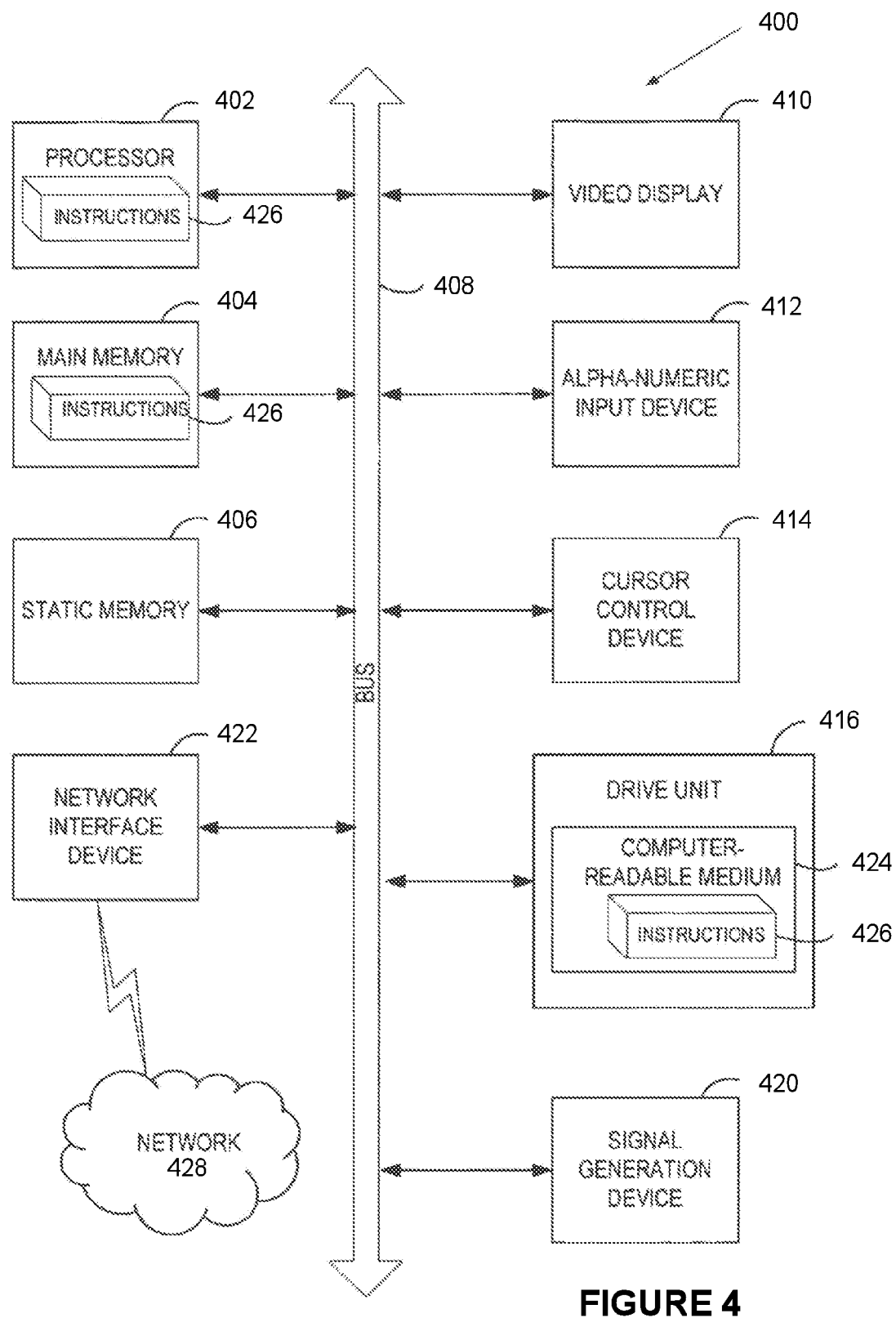
FIG. 4 is a schematic diagram showing a diagrammatic representation of a machine in the exemplary form of a computer system according to an embodiment of the invention.

FIG. 4 shows a diagrammatic representation of machine in the exemplary form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, an access point, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processor 402 (e.g., a central processing unit (CPU), a graphics processing unit (GPU) or both), a main memory 404 (e.g., read only memory (ROM), flash memory, dynamic random access memory (DRAM) such as synchronous DRAM (SDRAM) or Rambus DRAM (RDRAM), etc.) and a static memory 406 (e.g., flash memory, static random access memory (SRAM), etc.), which communicate with each other via a bus 408.

The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 420 (e.g., a speaker) and a network interface device 422.

The disk drive unit 416 includes a computer-readable medium 424 on which is stored one or more sets of instructions (e.g., software 426) embodying any one or more of the methodologies or functions described herein. The software 426 may also reside, completely or at least partially, within the main memory 404 and/or within the processor 402 during execution thereof by the computer system 400, the main memory 404 and the processor 402 also constituting computer-readable media.

The software 426 may further be transmitted or received over a network 428 via the network interface device 422.

While the computer-readable medium 424 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present invention. The term "computer-readable medium" shall accordingly be taken to include, but not be limited to, solid-state memories, and optical and magnetic media.

One or more of the methodologies or functions described herein may be embodied in a computer-readable medium on which is stored one or more sets of instructions (e.g., software). The software may reside, completely or at least partially, within memory and/or within a processor during execution thereof. The software may further be transmitted or received over a network.

It should be understood that components described herein include computer hardware and/or executable software code which is stored on a computer-readable medium for execution on appropriate computing hardware.

The terms "computer-readable medium" or "machine readable medium" should be taken to include a single medium or multiple media that store the one or more sets of instructions. The terms "computer-readable medium" or "machine readable medium" shall also be taken to include any non-transitory storage medium that is capable of storing, encoding or carrying a set of instructions for execution by a machine and that cause a machine to perform any one or more of the methodologies described herein. The terms "computer-readable medium" or "machine readable medium" shall accordingly be taken to include, but not be limited to, solid-state memories, and optical and magnetic media. For example, "computer-readable medium" or "machine readable medium" may include Compact Disc Read-Only Memory (CD-ROMs), Read-Only Memory (ROMs), Random Access Memory (RAM), and/or Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

It should be understood that processes and techniques described herein are not inherently related to any particular apparatus and may be implemented by any suitable combination of components. Further, various types of general purpose devices may be used in accordance with the teachings described herein. The present invention has been described in relation to particular examples, which are intended in all respects to be illustrative rather than restrictive. Those skilled in the art will appreciate that many different combinations will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A system comprising:
   a plurality of wireless access points distributed in a plurality of venues, wherein at least one mobile device is configured to wirelessly connect to one of the plurality of wireless access points during a live event at one of the plurality of venues;
   an access controller at each of the plurality of venues, the access controller connected to the plurality of wireless access points;
   a proxy server connected to the access controller at each of the plurality of venues, the proxy server further connected to a network for registration and authentication of the at least one mobile device with an approved social network, and wherein the proxy server is configured to, following the authentication, provide web access to the authenticated attendees, wherein the proxy server is further configured to, following the registration and authentication, collect social profile, preference and activity data on an attendee corresponding to the at least one mobile device; and
   a historic database coupled to the proxy server, the historic database for storing any information collected from the registered and authenticated at least one mobile device over time and from the plurality of venues, and wherein the collected information comprises social profile, preferences and activity data;
   wherein the proxy server is configured to access the historic database and wherein the proxy server is configured to update the historic database with social profile, preferences and activity data of the registered and authenticated at least one mobile device;
   wherein the proxy server is configured to present pre-prepared advertisements, generated using the information saved in the historic database, to the at least one mobile device at the venue, the pre-prepared advertisements matching the social profile and preferences of the attendee associated with the at least one mobile device.

2. The system of claim 1, wherein the proxy server is configured to deliver the pre-prepared advertisements in webpages accessed by the at least one mobile device.

3. The system of claim 1, further comprising storing the pre-prepared advertisements in the historic database.

4. A method comprising:
   authenticating and registering a mobile device at a proxy server at a venue during a live event, the mobile device connected to the processor via an access point;
   collecting social profile, preference and activity data from the mobile device;
   storing the social profile, preference and activity data from the mobile device in a historic database;
   updating the social profile, preference and activity data in the historic database with additional social profile, preference and activity data collected from the mobile device during the live event, wherein the historic database stores social profile, preference and activity data from all mobile devices authenticated and registered to the proxy server from a plurality of venues and a plurality of events;
   using the social profile, preference and activity data of all mobile devices authenticated and registered to the proxy server from the plurality of venues and the plurality of events in the historic database to enable generation of a focused advertisement personalized to the social profiles, preferences and activity data of each of the mobile devices authenticated and registered to the proxy server; and
   delivering, by the proxy server, the focused advertisement to the mobile device based on the social profile, preferences and activity data corresponding to the mobile device during the live event.

5. The method of claim 4, wherein the focused advertisement is delivered as an advertisement over a connected webpage by the proxy server.

6. The method of claim 5, wherein the focused advertisement includes incentives.

7. The method of claim 5, wherein the proxy server is enabled to initiate focused marketing.

8. A method comprising:
connecting a mobile device to a proxy server at a live event venue;
associating the mobile device with a unique identifier at the proxy server;
authenticating the mobile device at the proxy server after the mobile device is registered at the website, wherein authenticating the mobile device at the proxy server comprises adding the unique identifier of the mobile device to a list of authenticated users;
tracking activity of a user corresponding to the mobile device using the unique identifier by the proxy server; and
delivering an advertisement by the proxy server, to the mobile device based on the tracked activity of the user.

9. The method of claim 8, further comprising collecting user profile information from the social network after authenticating the mobile device and storing the user profile information with the list of authenticated users in a temporary database.

10. The method of claim 9, further comprising storing activity data of the user during the live event corresponding to the tracked activity of the user with the list of authenticated users in the temporary database.

11. The method of claim 10, further comprising transferring the user profile information and user activity data for storage in a historic database with an event identifier.

12. The method of claim 8, further comprising enabling initiation of focused marketing.

13. The method of claim 8, wherein status and preferences of all authenticated attendees are analyzed and mined to establish status and preferences of the attendees, and wherein the established status and preference of the user enable delivery of the focused advertisement based on the established status and preference of the user.

14. The method of claim 13, wherein the advertisement includes incentives.

15. The method of claim 8, further comprising downloading a client side java script as an application program to the web browser of the mobile device that allows the mobile device to sync to and transfer application and activity data to main server.

16. The method of claim 8, further comprising collecting preferences and social profile information from the mobile device.

17. The method of claim 8, wherein the advertisement is delivered as an advertisement over a connected webpage.

\* \* \* \* \*